July 29, 1930.  A. L. NELSON  1,771,859
PISTON
Filed Aug. 15, 1928  2 Sheets-Sheet 1
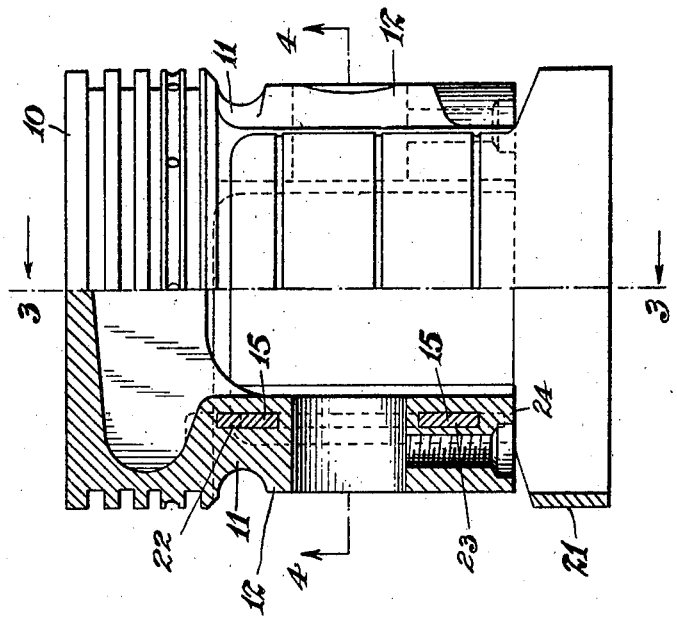
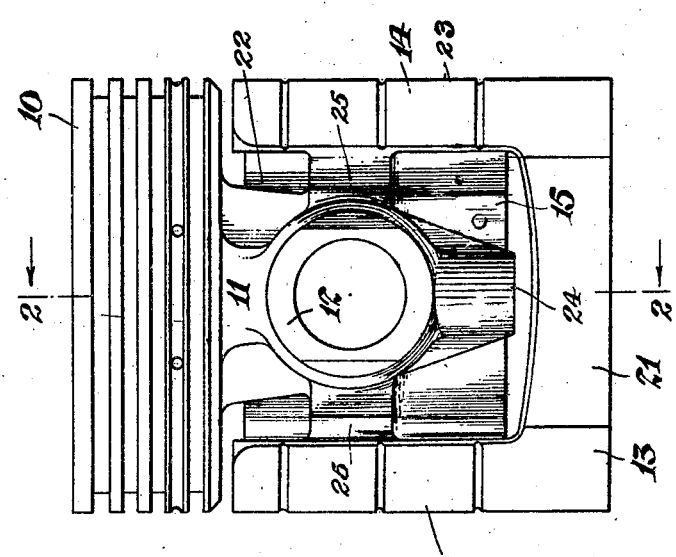

July 29, 1930.  A. L. NELSON  1,771,859
PISTON
Filed Aug. 15, 1928    2 Sheets-Sheet 2
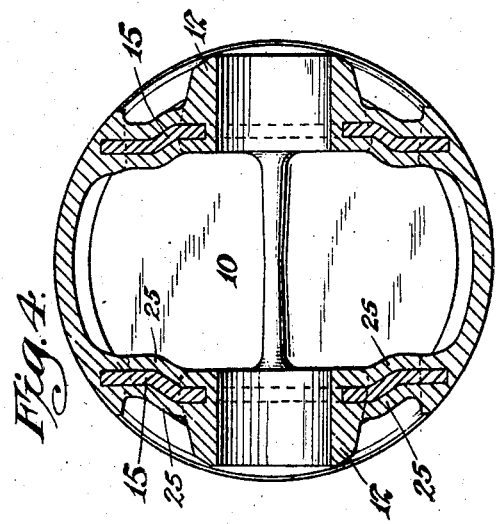
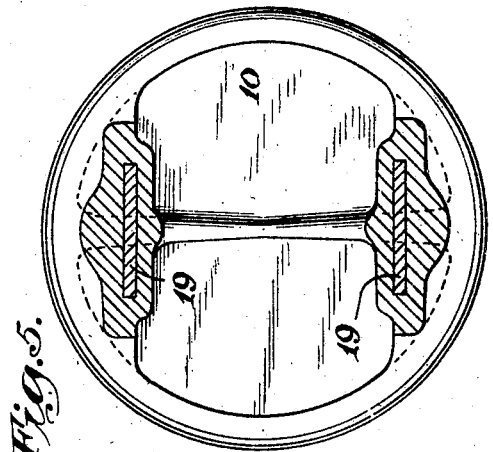
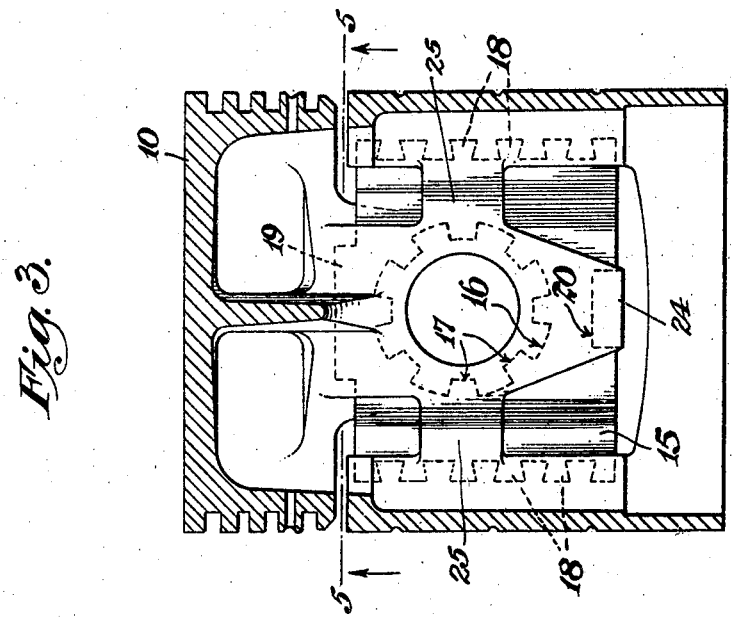

Patented July 29, 1930

1,771,859

UNITED STATES PATENT OFFICE

ADOLPH L. NELSON, OF DETROIT, MICHIGAN, ASSIGNOR TO BOHN ALUMINUM & BRASS CORPORATION, OF DETROIT, MICHIGAN

PISTON

REISSUED

Application filed August 15, 1928. Serial No. 299,719.

This invention relates to pistons, and particularly to pistons for use in automobile engines.

The invention is especially adapted to pistons in which the head and depending piers are formed of light-weight metal, and in which a pair of struts extend across the skirt to exert an influence on the rate of expansion of the bearing faces of the skirt.

A principal object of the invention is to provide a structure in which the intermediate part of each strut is embedded in, and completely surrounded by, the material of a pier.

Another feature of the invention resides in the fact that the middle part of the strut is apertured to provide an upper and a lower branch, each branch being entirely surrounded by pier material.

Further objects and advantages of the invention will become apparent as the description proceeds.

While preferred embodiments have been disclosed for purposes of illustration, it should be understood that various changes may be made in the structure without departing from the spirit and scope of the invention as hereinafter set forth and claimed.

In the drawings:

Fig. 1 is a side elevation of an automobile piston.

Fig. 2 is a section taken on line 2—2 of Fig. 1.

Fig. 3 is a section taken on line 3—3 of Fig. 2.

Fig. 4 is a section taken on line 4—4 of Fig. 2.

Fig. 5 is a section taken on line 5—5 of Fig. 3.

Referring to the drawings more particularly, the reference numeral 10 indicates the head of the piston, which is preferably formed of a light-weight metal, such as an alloy of aluminum, and numeral 11 is applied to integral piers depending from the head and formed with piston pin bosses 12. The skirt, which may also be formed of light-weight metal, comprises a lower circular portion 13 and cylinder-bearing portions 14 extending upwardly from the circular portion. The cylinder-bearing portions are held in spaced relation by a pair of struts 15 formed of a material less expansible than that of the piers, such as steel.

Each strut is of the shape indicated in Figs. 3 and 4, and formed with an aperture 16 which divides the strut into an upper branch 22 and a lower branch 23. Projections 17 extend into aperture 16. The ends of the strut carry dovetail fingers 18, and a projection 19 rises above the upper edge of the strut at the center, while a recess 20 is formed in the lower edge of the strut.

In forming the piston a pair of struts 15 are positioned in a mold and positively held while the metal forming the head and skirt is cast around them, forming the parts as illustrated. Attention is particularly called to the fact that the material of the pier completely surrounds the middle of the strut as a whole, as well as extending entirely around each of the branches 22 and 23, as shown at 24 in Fig. 2. This construction forms a firm attachment between the strut and pier, since the material of the pier shrinks faster than the material of the strut on cooling and forms a tight, closed grip about the strut. The projections 17 and 19 and the recess 20 also help to firmly anchor the strut in the pier.

In finishing the piston the parts 21 lying under the pin bosses are relieved by grinding them below the normal skirt diameter, or they may be slotted.

It may be desirable in some cases to strengthen the connection between the bosses forming the piston pin bearings and the cylinder-bearing portions, and this may be done as shown in Fig. 1 by forming ties 25 which extend between the bosses and the bearing portions and are continuous and homogeneous with the bosses and the bearing portions. In this case each strut is held by four separate complete bands of skirt material, one around branch 22, one around branch 23, one around the upper end of the strut (as viewed in Fig. 4), and one around the lower end of the strut (as viewed in Fig. 4).

I claim:

1. A piston comprising a head, piers depending from the head, cylinder-bearing portions on opposite sides of the piston, a pair of struts extending between the cylinder-bearing portions, the intermediate portion of each strut being formed with an upper branch and a lower branch, and each branch of each strut being entirely surrounded by the material of the piers.

2. A piston comprising a head, piers depending from the head, cylinder-bearing portions on opposite sides of the piston, a pair of struts extending between the cylinder-bearing portions, each strut being held by four separate complete bands of the material of the piers.

3. A piston comprising a head, piers depending from the head, piston pin bosses carried by the piers, cylinder-bearing portions on opposite sides of the piston, a pair of struts extending between the cylinder-bearing portions, each strut extending across the piston both above and below the piston pin bosses, the intermediate portion of each strut being embedded in a pier and being completely surrounded by a continuous band of the material of the pier.

4. A piston comprising a head, piers depending from the head and carrying piston pin bosses, cylinder-bearing portions on opposite sides of the piston, the head, piers and cylinder-bearing portions being formed of light-weight material, a pair of struts extending between the cylinder-bearing portions, the struts being formed of material less expansible than that of the piers, each strut extending across the piston both above and below the piston pin bosses, the intermediate portion of each strut being embedded in a pier and being completely surrounded by a continuous band of the material of the pier.

5. A piston comprising a head, piers depending from the head, piston pin bosses carried by the piers, cylinder-bearing portions on opposite sides of the piston, a pair of struts extending between the cylinder-bearing portions, each strut extending across the piston both above and below the piston pin bosses, the lower edge of each strut being formed with a recess, a continuous band of the material of the pier surrounding the intermediate portion of each strut and passing through the recess.

6. A piston comprising a head, piers depending from the head, piston pin bosses carried by the piers, cylinder-bearing portions on opposite sides of the piston, a pair of struts extending between the cylinder-bearing portions, each strut extending across the piston both above and below the piston pin bosses, the intermediate portion of each strut being completely surrounded by a continuous band of the material of the pier, and a continuous band of homogeneous material extending laterally from each pin boss and completely surrounding part of a strut.

7. A piston comprising a head, piers depending from the head and carrying piston pin bosses, cylinder-bearing portions on opposite sides of the piston, the head, piers and cylinder-bearing portions being formed of light-weight material, a pair of struts extending between the cylinder-bearing portions, the struts being formed of material less expansible than that of the piers, each strut extending across the piston both above and below the piston pin bosses, the intermediate portion of each strut being embedded in a pier and being completely surrounded by a continuous band of the material of the pier, and a continuous band of homogeneous material extending laterally from each pin boss and completely surrounding part of a strut.

In testimony whereof I affix my signature.

ADOLPH L. NELSON.